US009723066B2

(12) United States Patent
Kim (10) Patent No.: US 9,723,066 B2
(45) Date of Patent: Aug. 1, 2017

(54) SYSTEM AND METHOD FOR CALCULATING ARRANGEMENT DATA BETWEEN DEVICES (71) Applicant: UNIVERSITY OF SEOUL INDUSTRY COOPERATION FOUNDATION, Seoul (KR)

(72) Inventor: Jin Suk Kim, Seoul (KR)

(73) Assignee: UNIVERSITY OF SEOUL INDUSTRY COOPERATION FOUNDATION, Seoul (KR)

( * ) Notice: Subject to any disclaimer, the term of this patent is extended or adjusted under 35 U.S.C. 154(b) by 250 days.

(21) Appl. No.: 14/637,745

(22) Filed: Mar. 4, 2015

(65) Prior Publication Data
US 2015/0256606 A1 Sep. 10, 2015

(30) Foreign Application Priority Data

Mar. 5, 2014 (KR) .......................... 10-2014-0025969

(51) Int. Cl.
G06F 3/00 (2006.01)
H04L 29/08 (2006.01)
H04W 4/00 (2009.01)
H04M 1/67 (2006.01)
H04M 1/725 (2006.01)

(52) U.S. Cl.
CPC .............. *H04L 67/10* (2013.01); *H04M 1/67* (2013.01); *H04M 1/7253* (2013.01); *H04W 4/005* (2013.01); *H04W 4/008* (2013.01)

(58) Field of Classification Search
CPC .................................. G06F 3/017; H04L 67/10

USPC .......................................................... 715/748
See application file for complete search history.

(56) References Cited

U.S. PATENT DOCUMENTS

| 7,103,906 | B1 * | 9/2006 | Katz | H04N 7/17318 |
| | | | | 348/E7.071 |
| 8,649,659 | B2 * | 2/2014 | Lalwaney | H04L 65/4084 |
| | | | | 386/241 |
| 8,786,517 | B2 * | 7/2014 | Lewin | G06F 3/1446 |
| | | | | 345/1.3 |
| 9,213,480 | B2 * | 12/2015 | Keranen | G06F 3/04883 |
| 9,378,467 | B1 * | 6/2016 | Chaiyochlarb | G06N 99/005 |

(Continued)

FOREIGN PATENT DOCUMENTS

JP 07261721 A 10/1995
KR 101102087 B1 1/2012

(Continued)

OTHER PUBLICATIONS

Ken Hinckley et al., "Stitching: Pen Gestures that Span Multiple Displays", In the Proc. of AVI' 04, 9 pages, May 28, 2004, ISBN: 1-58113-867-9.

*Primary Examiner* — William Titcomb
(74) *Attorney, Agent, or Firm* — Brundidge & Stanger, P.C.

(57) ABSTRACT

A method for calculating arrangement data between devices includes: receiving an input of a first point on a display of a first device; receiving an input of a second point on a display of a second device; and calculating arrangement data between the first device and the second device based on data of a virtual straight line connecting the first point and the second point, and the arrangement data include a distance between the first device and the second device and an angle between the first device and the second device.

14 Claims, 8 Drawing Sheets

(56) References Cited

U.S. PATENT DOCUMENTS

| | | | |
|---|---|---|---|
| 9,400,561 B2* | 7/2016 | Fisunenko | G06F 3/017 |
| 9,430,919 B2* | 8/2016 | Mahowald | G06F 11/325 |
| 9,436,289 B2* | 9/2016 | Komori | G06F 3/013 |
| 9,612,337 B2* | 4/2017 | Floch | G01S 19/22 |
| 2005/0063335 A1* | 3/2005 | Shenfield | H04M 3/4938 370/329 |
| 2007/0060045 A1* | 3/2007 | Prautzsch | H04B 7/18523 455/3.06 |
| 2007/0124503 A1* | 5/2007 | Ramos | G06F 3/017 709/248 |
| 2008/0155062 A1* | 6/2008 | Rabold | H04L 29/06027 709/219 |
| 2008/0316105 A1* | 12/2008 | Seong | G01S 5/12 342/442 |
| 2009/0204663 A1* | 8/2009 | Patwari | H04N 7/17318 709/203 |
| 2009/0259711 A1* | 10/2009 | Drieu | G06F 17/30053 709/201 |
| 2010/0009644 A1* | 1/2010 | Izumi | H04B 7/086 455/132 |
| 2011/0271319 A1* | 11/2011 | Venable, Sr. | H04L 41/12 726/1 |
| 2012/0087634 A1* | 4/2012 | Lalwaney | H04L 65/4084 386/241 |
| 2012/0226392 A1* | 9/2012 | Kataoka | G08G 1/167 701/1 |
| 2013/0109301 A1* | 5/2013 | Hakola | H04W 76/023 455/39 |
| 2013/0242866 A1* | 9/2013 | Lin | H04W 76/023 370/328 |
| 2013/0244661 A1* | 9/2013 | Lin | H04W 76/023 455/436 |
| 2014/0376455 A1* | 12/2014 | Autti | H04L 5/0058 370/329 |
| 2015/0057006 A1* | 2/2015 | Gao | H04W 72/04 455/450 |
| 2017/0093700 A1* | 3/2017 | Gilley | H04L 45/44 |

FOREIGN PATENT DOCUMENTS

| | | |
|---|---|---|
| KR | 1020130006165 A | 1/2013 |
| KR | 1020130046892 A | 5/2013 |
| KR | 20130093634 A | 8/2013 |
| KR | 1020130119247 A | 10/2013 |
| KR | 1020130120708 A | 11/2013 |
| KR | 1020130140949 A | 12/2013 |

* cited by examiner

SYSTEM AND METHOD FOR CALCULATING ARRANGEMENT DATA BETWEEN DEVICES

CROSS-REFERENCE TO RELATED APPLICATION

This application claims the benefit of Korean Patent Application No. 10-2014-0025969 filed on Mar. 5, 2014, the disclosures of which are incorporated herein by reference.

TECHNICAL FIELD

The embodiments described herein pertain generally to a system and a method for calculating arrangement data between multiple devices.

BACKGROUND

The prevalence of smart phones enables many people to use various functions of smart phones such as listening to music, watching videos, surfing the web, etc. A smart phone includes a touch screen and provides an unlocking function executed by inputting a password or a pattern. Recently, there has been provided a service that enables a user to unlock the smart phone by knocking or signing on a display through the touch screen.

As a prior art regarding a smart phone providing such an unlocking function, Korean Patent Laid-open Publication No. 2013-0140949 discloses an apparatus and a method for recognizing a user pattern in a device.

Recently, the number of smart devices of each individual person has continuously increased. If a user wants to use multiple devices at the same time, the user needs to unlock each of the multiple devices first.

SUMMARY

The present disclosure relates to calculating arrangement data including a distance or an angle between devices or using such arrangement data to provide a specific function. Further, the present disclosure relates to shifting data between smart devices according to a distance and a direction of a user's touch and displaying the shifted data. If there are multiple smart devices, lines to be drawn to the respective devices can be used as a security key. Furthermore, the present disclosure relates to displaying a large image on corresponding positions of multiple smart devices.

In view of the foregoing, an example embodiment of the present disclosure provides a method for calculating arrangement data between devices, including: receiving an input of a first point on a display of a first device; receiving an input of a second point on a display of a second device; and calculating arrangement data between the first device and the second device based on data of a virtual straight line connecting the first point and the second point. The arrangement data may include a distance between the first device and the second device and an angle between the first device and the second device.

Another example embodiment of the present disclosure provides a system for calculating arrangement data between devices, including: a first device; and a second device. The first device may receive an input of a first point on a display of the first device, the second device may receive an input of a second point on a display of the second device, and the first device may calculate arrangement data between the first device and the second device based on data of a virtual straight line connecting the first point and the second point. The arrangement data may include a distance between the first device and the second device and an angle between the first device and the second device.

The above-described embodiments are merely illustrative in all aspects and shall not be construed as limiting the present disclosure. In addition to the above-described example embodiments, other example embodiments described in the accompanying drawings and the detailed description of the invention may exist.

According to any one of the above-described example embodiments, it is possible to calculate arrangement data including a distance or an angle between devices or possible to use such arrangement data to provide a specific function. Further, it is possible to shift displayed object between smart devices according to a distance and a direction of a user's touch and display the shifted object. If there are multiple smart devices, data of straight lines to be drawn to the respective devices can be used as a security key. Furthermore, it is possible to display a large image on corresponding positions of multiple smart devices.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements unless context dictates otherwise.

Figure 1:
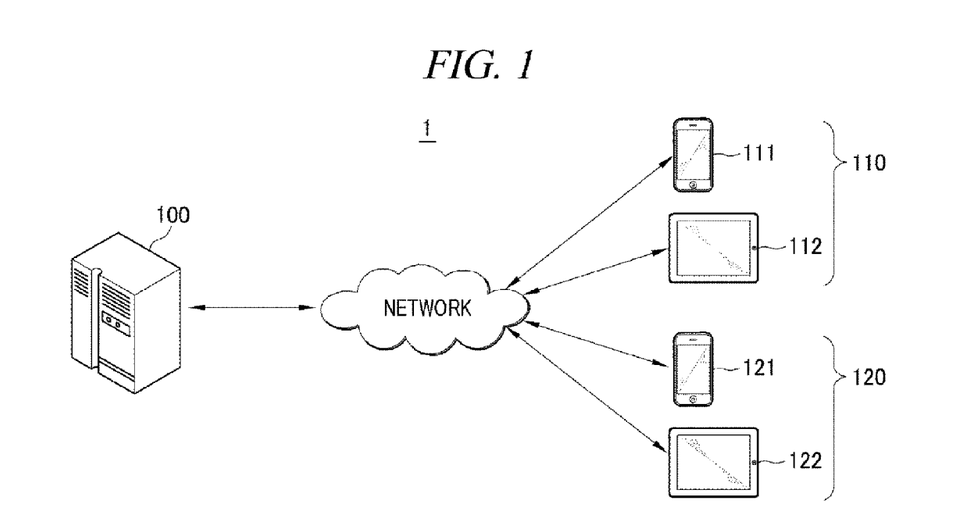
FIG. 1 is a configuration view of an arrangement data calculating system, in accordance with various embodiments described herein.

FIG. 1 is a configuration view of an arrangement data calculating system in accordance with an example embodiment. Referring to FIG. 1, an arrangement data calculating system 1 includes a first device 110 and a second device 120. The arrangement data calculating system 1 depicted in FIG. 1 is merely an example embodiment of the present disclosure, and, thus, the present disclosure shall not be construed as being limited to FIG. 1. That is, according to various example embodiments of the present disclosure, the arrangement data calculating system 1 may have a different configuration from the configuration depicted in FIG. 1.

The components of FIG. 1 constituting the arrangement data calculating system 1 are generally connected to each other via a network. By way of example, as depicted in FIG. 1, the first device 110 and the second device 120 are connected to a server 100 via the network.

The network refers to a connection structure that enables exchange of information between nodes such as devices and servers, and examples of the network may include 3GPP (3rd Generation Partnership Project) network, LTE (Long Term Evolution) network, WIMAX (World Interoperability for Microwave Access) network, Internet, LAN (Local Area Network), Wireless LAN (Wireless Local Area Network), WAN (Wide Area Network), PAN (Personal Area Network), Bluetooth network, satellite network, analog network, DMB (Digital Multimedia Broadcasting) network, etc., but are not limited thereto.

Referring to FIG. 1, a first network connecting the server 100 to the multiple devices and a second network connecting the first device 110 to the second device 120 may be different types of networks. By way of example, the first network may be a broadband network and the second network may be a local area network. An example of the broadband network may be a LTE network, and an example of the local area network may be a Wireless LAN.

The server 100 may provide contents through applications respectively installed in the first device 110 and the second device 120. Herein, the contents may include, for example, map data, image data, video data, and the like.

The first device 110 may receive an input at a first point on a display of the first device 110 through a user interface. Further, the first device 110 may receive an input at a third point on the display of the first device 110 through the user interface. The inputs at the first point and the third point may be a touch input or a drag input connecting the first point and the third point.

The second device 120 may receive an input at a second point on a display of the second device 110 through a user interface. Further, the second device 120 may receive an input at a fourth point on the display of the second device 120 through the user interface. The inputs at the second point and the fourth point may be a touch input or a drag input connecting the second point and the fourth point.

The first device 110 can calculate arrangement data between the first device 110 and the second device 120 based on data of a virtual straight line connecting the first point and the second point. The arrangement data may include a distance between the first device 110 and the second device 120 and an angle between the first device 110 and the second device 120. As one example, the angle may be calculated based a first angle between a line connecting the first point and the third point and a side of the first device 110. As another example, the angle may be calculated based a second angle between a line connecting the second point and the fourth point and a side of the second device 120.

The first device 110 and the second device 120 may be devices in which applications can be installed, and may include wireless communication devices with portability and mobility such as PCS (Personal Communication System), GSM (Global System for Mobile communications), PDC (Personal Digital Cellular), PHS (Personal Handyphone System), PDA (Personal Digital Assistant), IMT (International Mobile Telecommunication)-2000, CDMA (Code Division Multiple Access)-2000, W-CDMA (W-Code Division Multiple Access), Wibro (Wireless Broadband Internet), 3G, 4G terminals, and smart phones. Further, examples of the first device 110 and the second device 120 may include all kinds of handheld-based wireless communication devices such as smart pads, tablet PCs, and the like.

Figure 2:
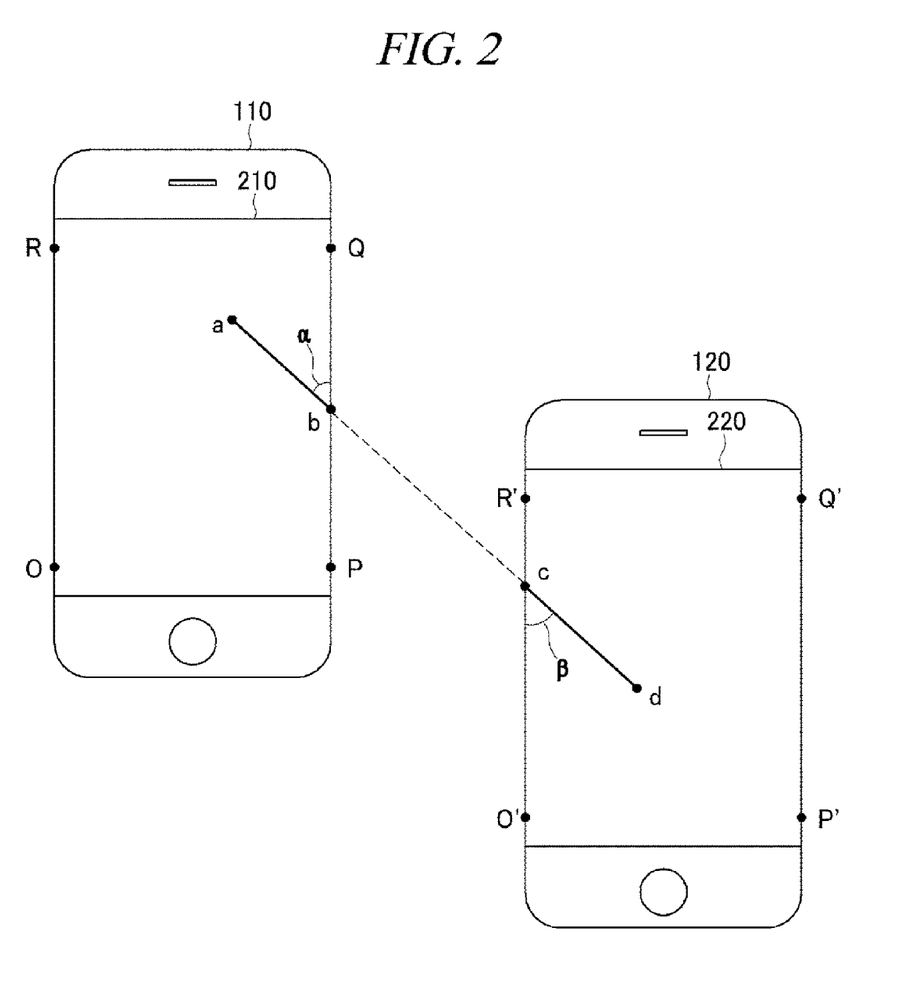
FIG. 2 is a diagram provided to explain a process of calculating arrangement data when a first device and a second device are arranged in parallel with each other, in accordance with various embodiments described herein.

FIG. 2 is a diagram provided to explain a process of calculating arrangement data when a first device and a second device are arranged in parallel with each other in accordance with an example embodiment.

Referring to FIG. 2, the first device 110 may receive an input connecting a point a and a point b on a display 210 of the first device 110 through a user interface. Further, the second device 120 may receive an input connecting a point c and a point d on a display 220 of the second device 120 through a user interface. Such user's inputs may be performed by a user's motion of drawing a straight line from the point a to the point d.

Hereinafter, calculation of arrangement data between devices performed by the first device 110 will be described. However, those skilled in the art will easily understand that the second device 120 can also perform the same function.

If a user draws a straight line ad from the point a to the point d at a substantially constant speed, a length of a straight line be can be calculated based on a length of a straight line ab connecting the point a and the point b and a speed of drawing the straight line ab and a length of a straight line cd connecting the point c and the point d and a speed of drawing the straight line cd. Herein, the length of the straight line ab and the speed of drawing the straight line ab are data which can be recognized by the first device 110, and the length of the straight line cd and the speed of drawing the straight line cd are data which can be recognized by the second device 120.

Otherwise, the first device 110 may directly receive an input of distance between the point a and the point d from the user. By way of example, when the first device 110 manually receives an input of distance through the user interface, the first device 110 first receives an input of a reference length unit through the user interface and then receives an input of a value. By way of example, if the reference length unit is set to cm, when the first device 110 receives an input of a value of 10 through the user interface, the first device 110 can receive an input of a length of 10 cm as distance. As another example, if the reference length unit is set to span, when the first device receives an input of a value of 3 through the user interface, the first device can receive an input of a length of 3 spans as distance. As such, if the distance between the point a and the point d is input, the length of the straight line ab is data which can be recognized by the first device 110 and the length of the straight line cd is also data which can be recognized by the second device 120, and, thus, the first device 110 or the second device 120 can calculate the length of the straight line bc.

Alternatively, the distance between the point a and the point d may be automatically detected using various distance sensors such as an infrared sensor or the like.

By way of example, it is assumed that the reference length unit is set to cm and the first device 110 receives an input of a value of 10 through the user interface. The first device 110 can calculate a distance between the point a and the point b input on the display and the second device 120 can calculate a distance between the point c and the point d input on the display. Herein, the first device 110 may receive a distance between the point c and the point d from the second device 120. The first device 110 can determine a length of the virtual straight line bc between the first device 110 and the second device 120 based on a distance between the point a and the point b and the distance between the point c and the point d.

Further, the first device 110 can calculate an angle between the first device 110 and the second device 120. By way of example, if the first device 110 receives inputs of the point a and the point b on the display 210 through the user interface, an angle α between the straight line ab connecting the point a and the point b and a side QP of the first device 110 can be calculated. If the second device 120 receives inputs of the point c and the point d on the display 220 through the user interface, an angle β between the straight line cd connecting the point c and the point d and a side O'R' of the second device 120 can be calculated. Based on the angle α or the angle β, the angle between the first device 110 and the second device 120 can be calculated.

The length of the straight line bc and the angle α or the angle β can be used as arrangement data between the first device 110 and the second device 120.

The first device 110 and the second device 120 can unlock each device using the arrangement data. By way of example, the first device 110 and the second device 120 may receive an input for setting an unlocking straight line connecting two points on the respective displays, and store setting data of the unlocking straight line. Then, the first device 110 and the second device 120 determines a similarity between newly input data of a virtual straight line and the stored data of the unlocking straight line, and if the similarity is equal to or higher than a threshold value, the first device 110 and the second device 120 can unlock each device. Herein, the similarity may be determined based on the arrangement data between the first device 110 and the second device 120.

Figure 3:
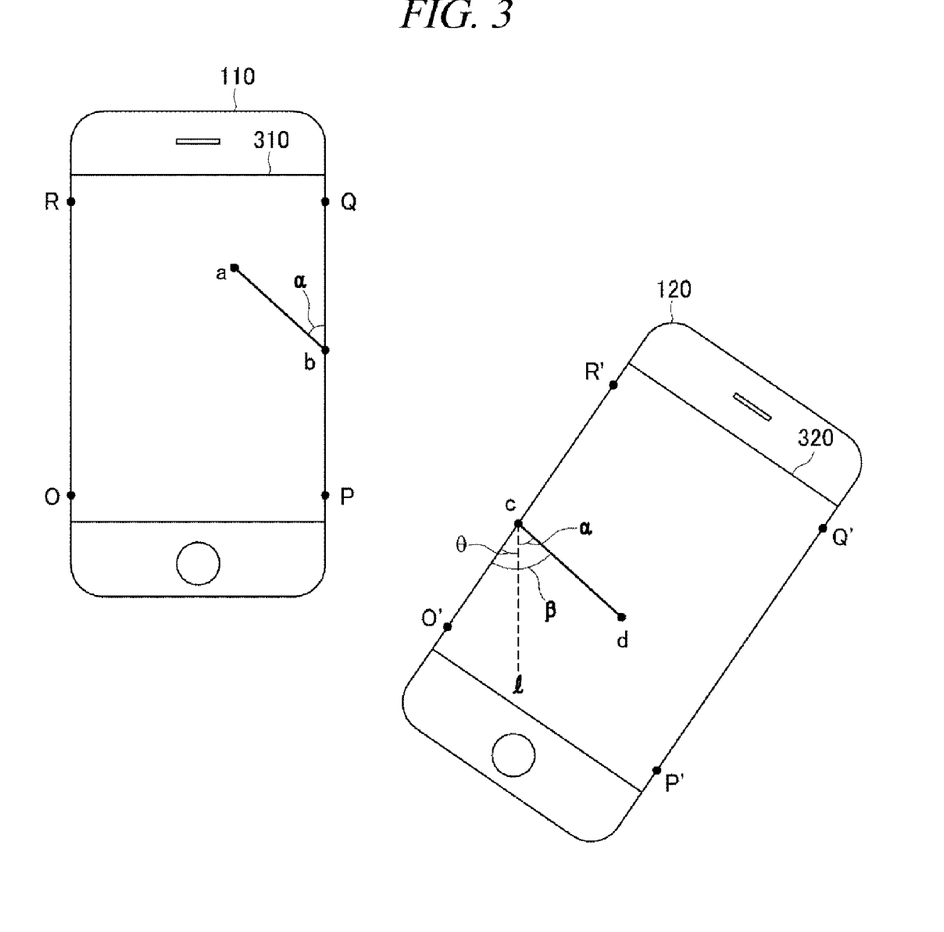
FIG. 3 is a diagram provided to explain a process of calculating arrangement data in a case where a first device and a second device are arranged at a predetermined angle, in accordance with various embodiments described herein.

FIG. 3 is a diagram provided to explain a process of calculating arrangement data in a case where a first device and a second device are arranged at a predetermined angle in accordance with an example embodiment. Herein, a method for calculating the distance between the first device 110 and the second device 120 is the same as the method for calculating the distance in the case where the first device 110 and the second device 120 are arranged in parallel with each other, and, thus, explanation thereof will be omitted.

If the first device 110 receives inputs of a point a and a point b on a display 310 through a user interface, an angle α between a straight line ab connecting the point a and the point b and a side QP of the first device 110 can be calculated. Further, if the device 120 receives inputs of a point c and a point d on a display 320 through a user interface, an angle β between a straight line cd connecting the point c and the point d and a side O'R' of the second device 120 can be calculated.

Herein, an angle θ between the first device 110 and the second device 120 can be obtained by calculating a difference between the angle β of the second device 120 and the angle α of the first device 110.

Figure 4A:
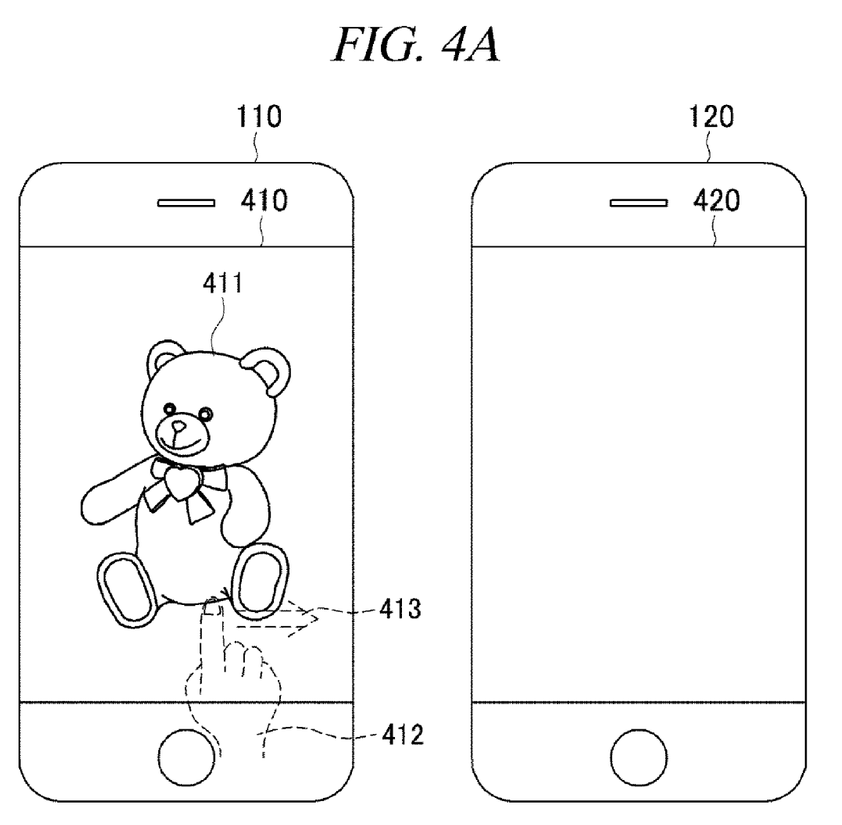
FIG. 4A and FIG. 4B are diagrams provided to explain a process of sharing a content displayed on a first device with a second device, in accordance with various embodiments described herein.
Figure 4B:
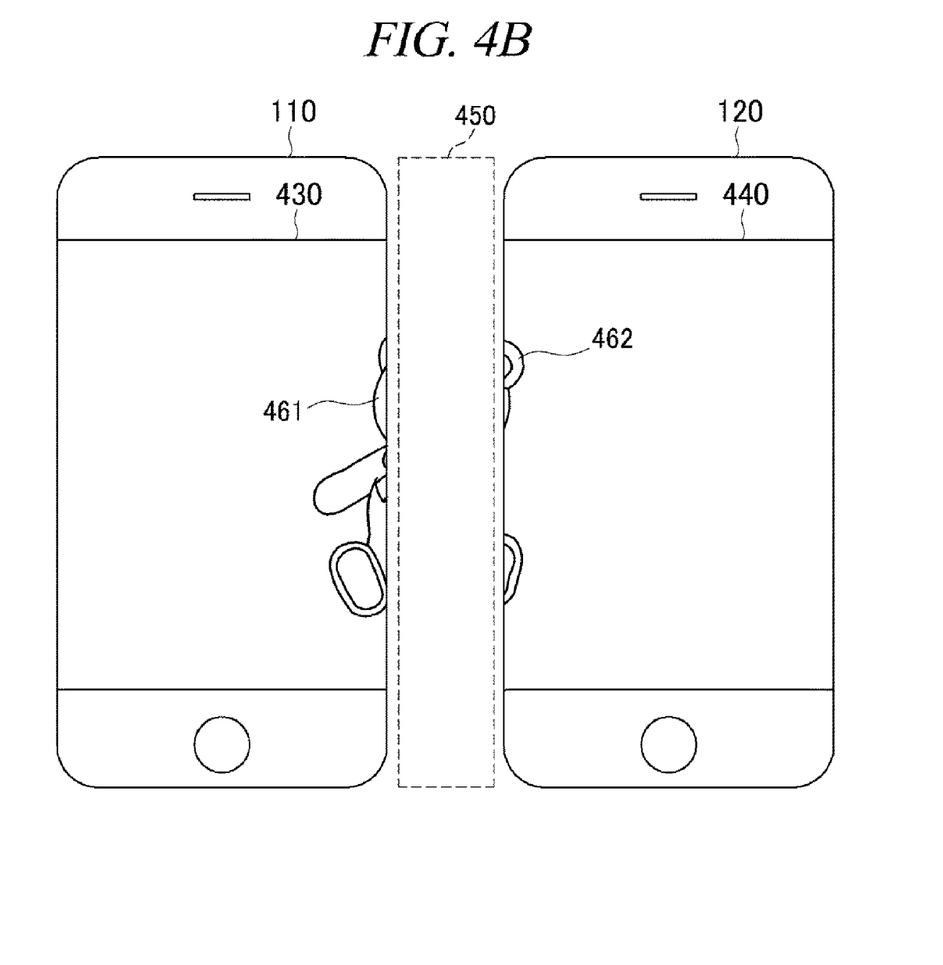

FIG. 4A and FIG. 4B are diagrams provided to explain a process of sharing a content displayed on a first device with a second device in accordance with an example embodiment.

FIG. 4A is a diagram illustrating a screen displaying a bear character 411 on a display 410 of the first device 110. Referring to FIG. 4A, the first device 110 may receive an input 413 for dragging the bear character 411 to the second device 120 through a user interface 412 to share the bear character 411 with the second device 120. Herein, if a content displayed on the display 410 of the first device 110 is shared with the display 420 of the second device 120, the first device 110 may share the content with the second device 120 using arrangement data.

FIG. 4B is a diagram provided to explain a process of sharing a bear character displayed on the display 430 of the first device 110 with the second device 120. Referring to FIG. 4B, if an image on the display 430 of the first device 110 is shared with the display 440 of the second device 120, the first device 110 and the second device 120 can display the image on the respective displays using arrangement data. Herein, the first device 110 can display a first area 461 of the image on the display 430, and the second device 120 can display a second area 462 of the image on the display 440.

By way of example, it is assumed that in order to share the bear character display on the first device 110 with the second device 120, the first device 110 receives an input for shifting the bear character in a first direction toward the second device 120 through the user interface. The first device 110 can calculate a distance between the first device 110 and the second device 120 using arrangement data between the first device 110 and the second device 120, and the first device 110 and the second device 120 can display partial areas of the bear character according to the calculated distance. The first device 110 and the second device 120 may calculate a virtual area 450 based on the distance between the first device 110 and the second device 120 and may not display a medium part of the bear character corresponding to the calculated virtual area. That is, the first device 110 may display only a partial left area of the bear character on the display device 430, and the second device 120 may only a partial right area of the bear character on the display 440 of the second device 120.

Figure 5:
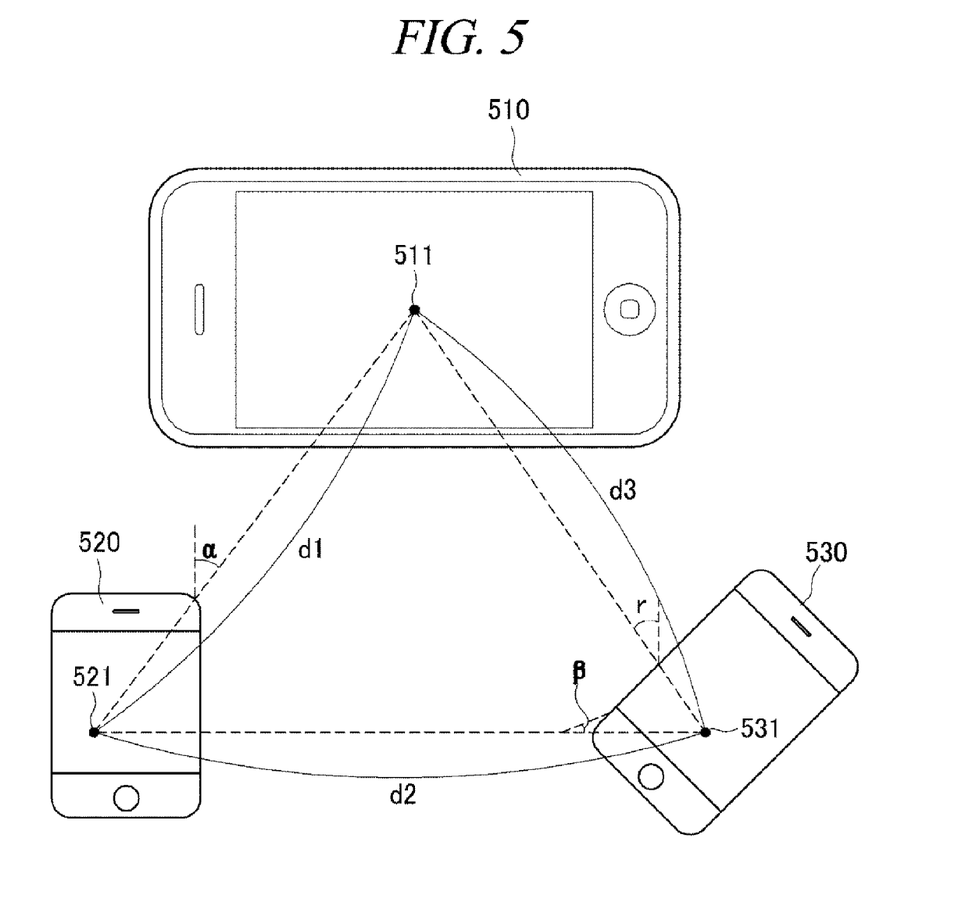
FIG. 5 is a diagram provided to explain a process of unlocking each display using arrangement data between multiple devices, in accordance with various embodiments described herein.

FIG. 5 is a diagram provided to explain a process of unlocking each display using arrangement data between multiple devices in accordance with an example embodiment. Referring to FIG. 5, it is assumed that a user has a first device 510, a second device 520, and a third device 530.

Firstly, when the first device 510, the second device 520, and the third device 530 receive inputs for setting an unlocking figure connecting three points on their respective displays using an application, the first device 510, the second device 520, and the third device 530 may store setting data of the received unlocking straight lines.

Then, the first device 510 may receive an input of a first point 511 on the display through a user interface, the second device 520 may receive an input of a second point 521 on the display through a user interface, and the third device 530 may receive an input of a third point 531 on the display through a user interface. By way of example, when the user draws a virtual straight line from the first point 511 to the second point 521 and then draws a virtual straight line from the second point 521 to the third point 531, the above-described inputs can be performed.

The first device 510 can calculate arrangement data among the first device 510, the second device 520, and the third device 530 based on data of the virtual straight line connecting the first point 511, the second point 521, and the third point 531. Herein, the arrangement data may include a distance d1 between the first device 510 and the second device 520, a distance d2 between the second device 520 and the third device 530, and a distance d3 between the third device 530 and the first device 510. Further, the arrangement data may include an angle α between the first device 510 and the second device 520, an angle β between the second device 520 and the third device 530, and an angle γ between the third device 530 and the first device 510.

Herein, if a similarity between newly input data of a virtual straight line and the stored data of the unlocking straight line→figure is equal to or higher than a threshold value, the displays of the first device 510, the second device 520, and the third device 530 can be unlocked.

Figure 6:
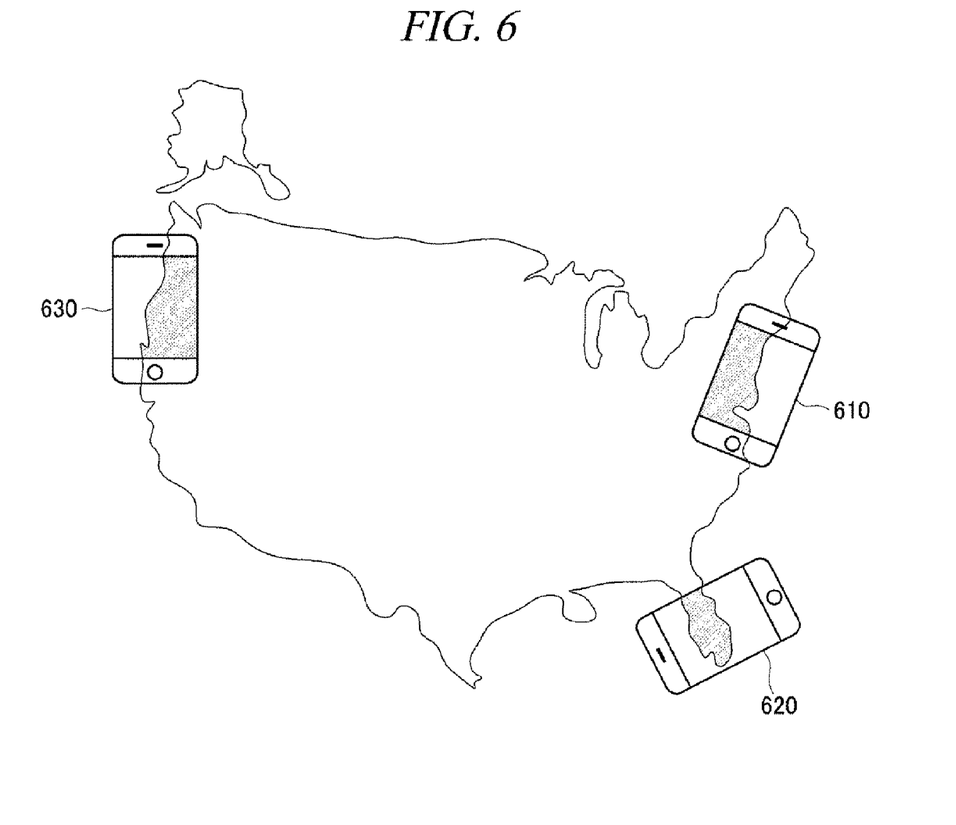
FIG. 6 is a diagram illustrating that some areas of a large image are displayed over multiple devices using arrangement data between the multiple devices, in accordance with various embodiments described herein.

FIG. 6 is a diagram illustrating that some areas of a large image are displayed by multiple devices using arrangement data between the multiple devices in accordance with an example embodiment. Referring to FIG. 6, the first device 110 can calculate some areas of a large image using arrangement data between multiple devices positioned near the first device 110, and the respective devices can display some areas of the large image.

By way of example, it is assumed that a map of the U.S. as a large image is spread out. Herein, if a first device 610, a second device 620, and a third device 630 are placed on the map of the U.S., the first device 610, the second device 620, and the third device 630 may recognize map data, and then, their respective displays display corresponding areas of the map where the first device 610, the second device 620, and the third device 630 are placed using the arrangement data among them.

By way of example, if the first device 610 is placed in New Jersey, Delaware, and Maryland on the map, the second device 620 is placed in Florida on the map, and the third device 630 is placed in California and Oregon on the map, the first device 610, the second device 620, and the third device 630 can calculate arrangement data among them. Herein, the first device 610 may display a partial area of New Jersey, Delaware, and Maryland on the display using the calculated arrangement data, the second device 620 may display a partial area of Florida on the display using the calculated arrangement data, and the third device 630 may display a partial area of California and Oregon on the display using the calculated arrangement data. Herein, the arrangement data may include a distance between the first device 610 and the second device 620 and an angle between the first device 610 and the second device 620, a distance between the second device 620 and the third device 630 and an angle between the second device 620 and the third device 630, and a distance between the third device 630 and the first device 610 and an angle between the third device 630 and the first device 610.

Figure 7:
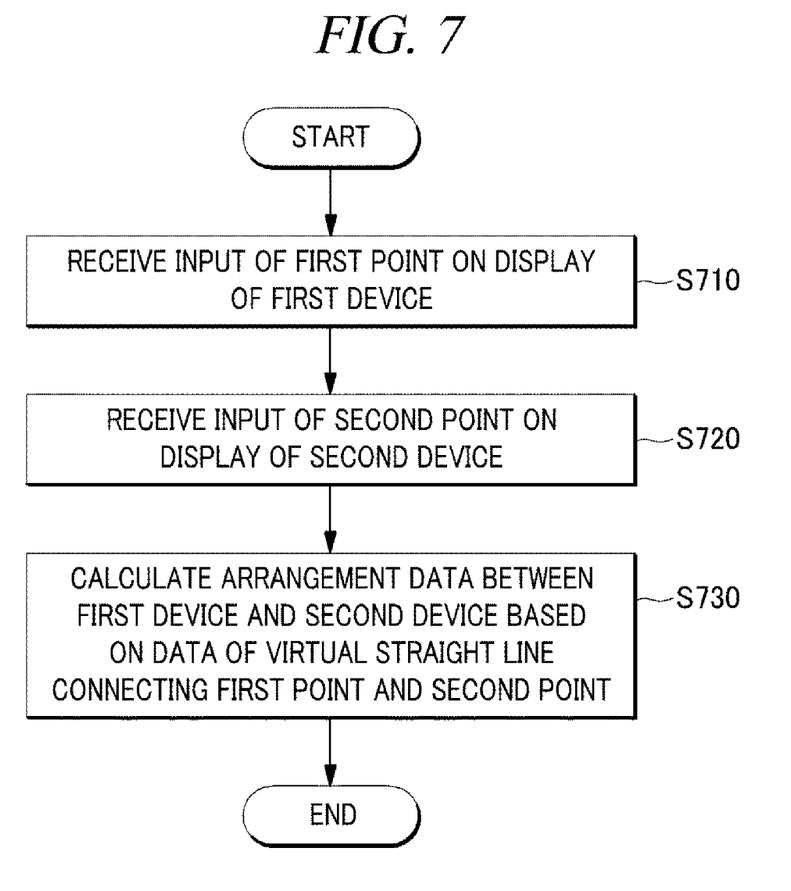
FIG. 7 is a flowchart showing an arrangement data calculating method, in accordance with various embodiments described herein.

FIG. 7 is a flowchart showing an arrangement data calculating method in accordance with an example embodiment. The arrangement data calculating method performed by the first device 110 and the second device 120 in accordance with an example embodiment shown in FIG. 7 includes steps performed in a sequence of time in the arrangement data calculating system 1 in accordance with the example embodiment shown in FIG. 1. Therefore, the contents with respect to the arrangement data calculating system 1 in accordance with the example embodiment shown in FIG. 1, which will be omitted hereafter, may also apply to the arrangement data calculating method performed by the first device 110 and the second device 120 in accordance with the example embodiment shown in FIG. 7.

In block S710, the first device 110 receives an input of a first point on a display of the first device 110. In block S720, the second device 120 receives an input of a second point on a display of the second device 120. In block S730, the first device 110 or the second device 120 calculates arrangement data between the first device 110 and the second device 120 based on data of a virtual straight line connecting the first point and the second point. Herein, the arrangement data may include a distance between the first device 110 and the second device 120 and an angle between the first device 110 and the second device 120.

Although not illustrated in FIG. 7, a step of receiving an input of distance between the first point and the second point by the first device 110 or the second device 120 may be further included. Herein, the arrangement data can be calculated based on the distance.

Although not illustrated in FIG. 7, a step of receiving an input of a third point on the display of the first device 110 by the first device 110 may be further included. Herein, the arrangement data can be calculated based on a drawing speed between the first point and the third point.

Although not illustrated in FIG. 7, a step of receiving an input of a fourth point on the display of the second device 120 by the second device 120 may be further included. Herein, the arrangement data can be calculated based on a drawing speed between the second point and the fourth point.

Although not illustrated in FIG. 7, a step of receiving an input of an unlocking straight line connecting two points on the respective displays of the first device 110 and the second device 120 by the first device 110 and the second device 120 and a step of storing data of the unlocking straight line may be further included.

Although not illustrated in FIG. 7, a step of unlocking the displays of the first device 110 and the second device 120 by the first device 110 and the second device 120 when a similarity between the input data of a virtual straight line and the stored data of the unlocking straight line is equal to or higher than a threshold value may be further included.

Although not illustrated in FIG. 7, a step of shifting a content using the arrangement data when the content displayed on the display of the first device 110 is shifted to the display of the second device 120 may be further included.

Although not illustrated in FIG. 7, a step of displaying a first area of an image on the display of the first device 110 and displaying a second area of the image on the display of the second device 120 using the arrangement data when the image is divided and displayed on the displays of the first device 110 and the second device 120 may be further included.

In the above description, block S710 to block S730 may be further divided or combined depending on an example embodiment of the present disclosure. Further, some of the steps may be omitted if necessary, and the sequence of the steps may be changed.

The arrangement data calculating method in accordance with the example embodiment illustrated in FIG. 7 can be embodied in a storage medium including instruction codes executable by a computer such as a program module executed by the computer. Besides, the data structure in accordance with the embodiment of the present disclosure can be stored in the storage medium executable by the computer. A computer readable medium can be any usable medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes a certain information transmission medium.

An example embodiment of the present disclosure may provide a method for providing an application executed in connection with the first device 110 and the second device 120 that perform the arrangement data calculating method illustrated in FIG. 7. Herein, the first device 110 or the second device 120 performs the arrangement data calculating method. Further, the application may be provided to the first device 110 and the second device 120 by the server 100.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

I claim:

1. A method for calculating arrangement data between devices, comprising:
   receiving an input of two points, each of two points being on separate respective displays of a first device and a second device, to set an unlocking line;
   calculating arrangement data between the first device and the second device based on the unlocking line connecting the two points;
   storing the arrangement data calculated based on the unlocking line connecting two points;
   receiving an input of a first point on a display of a first device;
   receiving an input of a second point on a display of a second device;
   calculating arrangement data between the first device and the second device based on a line connecting the first point and the second point, wherein the arrangement data includes a distance between the first device and the second device and an angle between the first device and the second device; and
   unlocking the first device and the second device based on the unlocking line, by determining a similarity between the arrangement data based on the line connecting the first point and the second point and the stored arrangement data.

2. The method of claim 1, further comprising:
   receiving an input of distance between the first point and the second point,
   wherein the arrangement data is calculated based on the distance.

3. The method of claim 1, further comprising:
   receiving an input of a third point on the display of the first device,
   wherein the arrangement data is calculated based on a drawing speed between the first point and the third point.

4. The method of claim 3, wherein the angle is calculated based on a first angle between a line connecting the first point and the third point and a side of the first device.

5. The method of claim 1, further comprising:
   receiving an input of a fourth point on the display of the second device,
   wherein the arrangement data is calculated based on a drawing speed between the second point and the fourth point.

6. The method of claim 5, wherein the angle is calculated based on a second angle between a line connecting the second point and the fourth point and a side of the second device.

7. The method of claim 1,
   wherein the unlocking comprises unlocking the displays of the first device and the second device when the determined similarity is equal to or higher than a threshold value.

8. The method of claim 1, further comprising:
   shifting a content using the arrangement data when the content displayed on the display of the first device is shifted to the display of the second device.

9. The method of claim 1, further comprising:
   displaying a first area of an image on the display of the first device and displaying a second area of the image on the display of the second device using the arrangement data when the image is divided and displayed on the displays of the first device and the second device.

10. A system for calculating arrangement data between devices, comprising:
    a first device; and
    a second device,
    wherein:
    the first device and the second device receives an input of two points, each of two points being on separate respective displays of the first device and the second device, to set an unlocking line, the first device calculates arrangement data between the first device and the second device based on the unlocking line connecting the two points, the first device stores the arrangement data calculated based on the unlocking line connecting two points, the first device receives an input of a first point on a display of the first device, the second device receives an input of a second point on a display of the second device, the first device calculates arrangement data between the first device and the second device based on a line connecting the first point and the second point, the arrangement data includes a distance between the first device and the second device and an angle between the first device and the second device, and the unlocking line is used to unlock the first device and the second device by determining a similarity between the arrangement data calculated based on the line connecting the first point and the second point and the stored arrangement data.

11. The system of claim 10, wherein the first device receives an input of a third point on the display of the first device, and wherein the arrangement data is calculated based on a drawing speed between the first point and the third point.

12. The system of claim 11, wherein the angle is calculated based on a first angle between a line connecting the first point and the third point and a side of the first device.

13. The system of claim 10, wherein the second device receives an input of a fourth point on the display of the second device, and wherein the arrangement data is calculated based on a drawing speed between the second point and the fourth point.

14. The system of claim 13, wherein the angle is calculated based on a second angle between a line connecting the second point and the fourth point and a side of the second device.

* * * * *